US008360637B2

(12) United States Patent
Kato

(10) Patent No.: US 8,360,637 B2
(45) Date of Patent: Jan. 29, 2013

(54) SIGNAL PROCESSING DEVICE AND LIQUID DROPLET EJECTION DEVICE

(75) Inventor: Yoshinori Kato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 494 days.

(21) Appl. No.: 12/748,465

(22) Filed: Mar. 29, 2010

(65) Prior Publication Data

US 2010/0253733 A1 Oct. 7, 2010

(30) Foreign Application Priority Data

Apr. 2, 2009 (JP) ................................. 2009-089975

(51) Int. Cl.
*G01K 7/00* (2006.01)
*G01N 25/02* (2006.01)

(52) U.S. Cl. ............ 374/183; 374/16; 374/27; 374/170; 374/141

(58) Field of Classification Search .................. 374/183, 374/16, 27, 170, 141
See application file for complete search history.

(56) References Cited

U.S. PATENT DOCUMENTS 4,419,021 A * 12/1983 Terada et al. ................. 374/101
4,422,066 A * 12/1983 Belcourt et al. .............. 340/500
4,636,092 A * 1/1987 Hegyi ........................... 374/178
5,040,417 A * 8/1991 Rowlette .................... 73/335.05
5,656,928 A * 8/1997 Suzuki et al. ................ 324/71.1

FOREIGN PATENT DOCUMENTS

JP 2001-255213 A 9/2001
JP 2001-281183 A 10/2001

* cited by examiner

*Primary Examiner* — Lisa Caputo
*Assistant Examiner* — Mirellys Jagan
(74) *Attorney, Agent, or Firm* — SOLARIS Intellectual Property Group, PLLC

(57) ABSTRACT

A signal processing device is provided including: an alternating voltage generation section that generates a square shaped alternating voltage from plural direct voltages, and applies the square shaped alternating voltage to a sensor that is either a temperature detection sensor or a humidity detection sensor; a current-voltage conversion section that converts current of an output signal output from the sensor to an analog voltage; a selector section that selects a range of the current convertible by the current-voltage conversion section from one or other of plural current ranges; and a resistance value computation section that computes the resistance value of the sensor, based on the voltage value of the analog voltage converted by the current-voltage conversion section, the range of current convertible by the current-voltage conversion section, and the voltage value of the voltage generated by the alternating voltage generation section.

8 Claims, 10 Drawing Sheets

SIGNAL PROCESSING DEVICE AND LIQUID DROPLET EJECTION DEVICE

CROSS-REFERENCE TO RELATED APPLICATION

This application is based on and claims priority under 35 USC 119 from Japanese Patent Application No. 2009-089975 filed on Apr. 2, 2009 which is incorporated by reference herein.

BACKGROUND

1. Technical Field

The present invention relates to a signal processing device and to a liquid droplet ejection device, and in particular to a signal processing device and liquid droplet ejection device for processing a sensor signal output by a temperature sensor or a humidity sensor.

2. Related Art

Generally, as a temperature detection sensor, thermistors are known whose resistance value changes according to temperature (thermistic sensors). A specific example of the relationship between the resistance value and the temperature of such thermistors is shown in FIG. 8. As shown in FIG. 8, the resistance value of the thermistor changes in room temperature environments by about 50% to 150%, from a central value of 10 kΩ. An example of a temperature sensor circuit for generating a voltage corresponding to the resistance value of the thermistor is shown in FIG. 9. In this temperature sensor circuit, a reference electrical potential Vcc is divided by the resistance of the thermistor and a known resistor, so as to generate a voltage dependent on the resistance value of the thermistor (see, for example, Japanese Patent Application Laid-Open (JP-A) No. 2001-255213).

Generally, as a humidity detection sensor, humidity sensors are known that employ elements whose resistance value changes according to humidity. A specific example of the relationship between the resistance value and the humidity of such humidity sensors is shown in FIG. 10. As shown in FIG. 10, there is a greater amount of change in the resistance value of the humidity sensor compared to that in the thermistor, with a change of 3 to 4 orders of magnitude. An example of a humidity sensor circuit for generating a voltage that corresponds to the resistance value of a humidity sensor is shown in FIG. 11. Since the amount of change in the resistance value in this humidity sensor circuit is large, often logarithmic compression is performed by employing a diode that utilizes the characteristics of a semiconductor PN junction.

FIG. 2 shows an example of an inkjet head provided with one each of a thermistor and a humidity sensor. In the circuit for generating a voltage corresponding to the resistance value of the sensor in this inkjet head is now considered for a case in which the humidity sensor circuit example shown in FIG. 9, and the humidity sensor circuit example shown in FIG. 11, are applied.

This inkjet head is formed with two circuits that are electrically the same as each other. These two circuits only differ in whether the type of sensor mounted is a thermistor, or a humidity sensor. The interface are taken to be the same, irrespective of the type of sensor. Consequently, it is necessary to detect both resistance values of a thermistor and resistance values of a humidity sensor, respectively, using the same circuit. There is a memory mounted to the inkjet head. The information indicating whether a thermistor or a humidity sensor is mounted is stored in this memory.

Were the humidity sensor circuit shown in FIG. 9 to be applied as a temperature sensor circuit, the humidity sensor circuit would be required to apply an alternating voltage of a specific amplitude (for example, 1 Vpp) at 1 kHz to the humidity sensor. Consequently, the reference electrical potential Vcc would need to be transformed into an alternating current power source. However, a bias voltage applied to the sensor changes depends on the ratio of the resistor R1 to the sensor resistance, and so an alternating voltage of a specific amplitude cannot be applied. Furthermore, the resistance value of a humidity sensor changes by 3 to 4 orders of magnitude as described above, so the dynamic range of the voltage output must be of this order or greater. Furthermore, high speed responsiveness is required of the circuit itself in order to correspond to an alternating bias of 1 kHz. However, it is generally difficult to achieve both a high dynamic range (low noise) and high speed properties at the same time. Therefore these problems arise when a temperature sensor circuit is applied as a humidity sensor circuit.

On the other hand, were the humidity sensor circuit shown in FIG. 11 to be applied as a temperature sensor circuit, logarithmic transformation would be performed on the resistance value of the temperature sensor. Therefore, in order to increase the resolution of temperature detection, the dynamic range of the voltage output would need to be increased. Furthermore, in order to correspond to an alternating bias of 1 kHz, a high speed response is desired, similarly to when detecting temperature. Consequently, it is similarly difficult to achieve both a high dynamic range (low noise) and high speed at the same time. Therefore problems arise when a humidity sensor circuit is applied as a temperature sensor circuit.

SUMMARY

The present invention provides a signal processing device and for processing a sensor signal, with both high resolution of temperature and dynamic range corresponding to a humidity detection range, and a liquid droplet ejection device of the same.

A signal processing device according to a first aspect of the present invention is a signal processing device including: an alternating voltage generation section that generates a square shaped alternating voltage from plural direct voltages, and applies the square shaped alternating voltage to a sensor that is either a temperature detection sensor or a humidity detection sensor; a current-voltage conversion section that converts current of an output signal output from the sensor to an analog voltage; a selector section that selects a range of the current convertible by the current-voltage conversion section from one or other of plural current ranges; and a resistance value computation section that computes the resistance value of the sensor, based on the voltage value of the analog voltage converted by the current-voltage conversion section, the range of current convertible by the current-voltage conversion section, and the voltage value of the voltage generated by the alternating voltage generation section.

BRIEF DESCRIPTION OF THE DRAWINGS

An exemplary embodiment of the present invention will be described in detail based on the following figures, wherein.

DETAILED DESCRIPTION

Figure 1:
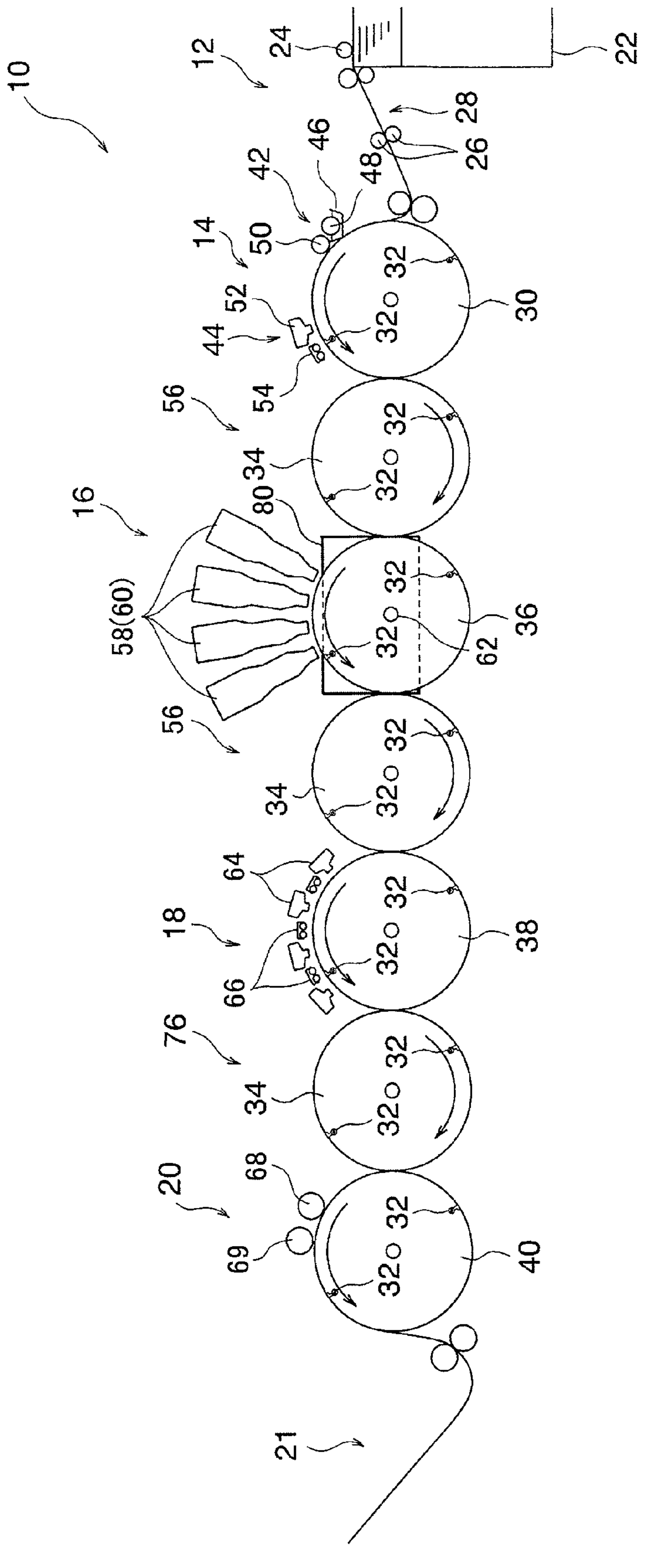
FIG. 1 is a schematic configuration diagram showing a schematic configuration of an example of an image forming apparatus in which liquid droplets are ejected for forming an image using a liquid droplet ejection device according to an exemplary embodiment of the present invention.

First, explanation follows regarding an image forming apparatus that ejects liquid droplets for forming an image using a liquid droplet ejection device according to an exemplary embodiment of the present invention. FIG. 1 is a schematic configuration diagram schematically showing an example of the image forming apparatus.

An image forming apparatus 10 according to the present exemplary embodiment is provided with a paper feed conveying section 12, a processing liquid application section 14, an image forming section 16, an ink drying section 18, an image fixing section 20, and a discharge section 21. The paper feed conveying section 12 feeds and conveys paper, at the conveying direction upstream side of sheets of paper (referred to as "paper" below), serving as a recording medium. The processing liquid application section 14 applies a processing liquid onto a recording face of the paper, at the downstream side of the paper feed conveying section 12 along the paper conveying direction. The image forming section 16 forms an image on the recording face of the paper. The ink drying section 18 dries the image that has been formed on the recording face. The image fixing section 20 fixes the dried image to the paper. The discharge section 21 discharges the paper to which the image has been fixed.

Explanation will now be given of each of the processing sections.

Paper Feed Conveying Section

In the paper feed conveying section 12 are provided a stacking section 22, in which paper is stacked, and, to the downstream side of the stacking section 22 in the paper conveying direction (this is sometimes referred to below as "downstream side"), a feed section 24 that feeds out paper stacked in the stacking section 22, one sheet at a time. The paper fed out by the feed section 24 is conveyed toward the processing liquid application section 14 through a conveying section 28 configured by plural pairs of rollers 26.

Processing Liquid Application Section

A processing liquid application drum 30 is rotatably disposed in the processing liquid application section 14. Retaining members 32 are provided to the processing liquid application drum 30 for nipping the leading edge of the paper and retaining the paper. The paper is conveyed to the downstream side, with the paper in a retained state on the surface of the processing liquid application drum 30 due to the retaining members 32, by rotation of the processing liquid application drum 30.

Note that the retaining members 32 are also provided to an intermediate conveying drum 34, an image forming drum 36, an ink drying drum 38, and an image fixing drum 40, described below, in a similar manner to provision to the processing liquid application drum 30. The paper is passed from a drum on the upstream side and received by a drum on the downstream side by use of the retaining members 32.

A processing liquid application device 42 and a processing liquid drying device 44 are disposed above the processing liquid application drum 30, around the circumferential direction of the processing liquid application drum 30. Processing liquid is applied to the recording face of the paper by the processing liquid application device 42, and this processing liquid is dried by the processing liquid drying device 44.

The processing liquid here reacts with ink for forming an image, having the effect of aggregating colorants (pigments) and promoting separation of colorants from their solvent medium. A reservoir section 46 is provided to the processing liquid application device 42, and processing liquid is stored in the reservoir section 46. A portion of a gravure roller 48 is steeped in the processing liquid.

A rubber roller 50 is disposed in pressing contact with the gravure roller 48. The rubber roller 50 makes contact with the recording face (front face) side of the paper and applies processing liquid thereto. There is also a squeegee (not shown in the drawings) that makes contact with the gravure roller 48, and meters the processing liquid amount applied to the recording face of the paper.

In the processing liquid drying device 44, a heated air nozzle 52 and an infra-red heater 54 (referred to below as "IR heater 54") are disposed in close proximity to the surface of the processing liquid application drum 30. The solvent medium in the processing liquid, such as, for example, water or the like, is evaporated by the heated air nozzle 52 and the IR heater 54, and a solid or thin film processing liquid layer is formed on the recording face side of the paper. By making the processing liquid into a thin layer by the processing liquid drying process, dots of ink ejected droplets make contact with the paper surface in the image forming section 16, and the necessary dot size is obtained, reacting with the processing liquid formed in a thin layer, aggregating colorants, and the actions to immobilize the dots on the paper surface are readily obtained.

In this manner, the processing liquid is applied to the recording face in the processing liquid application section 14, and the dried paper is conveyed to an intermediate conveying section 56 provided between the processing liquid application section 14 and the image forming section 16.

Intermediate Conveying Section

In the intermediate conveying section 56, the intermediate conveying drum 34 is rotatably provided, the paper is retained on the surface of the intermediate conveying drum 34 by the retaining members 32 provided to the intermediate conveying drum 34, and the paper is conveyed toward the downstream side by rotation of the intermediate conveying drum 34. Since the later intermediate conveying section 56 and intermediate conveying section 56 are of substantially the same configuration as this intermediate conveying section 56, detailed explication thereof is omitted.

Image Forming Section

In the image forming section 16, the image forming drum 36 is rotatably provided. The paper is retained on the surface of the image forming drum 36 by the retaining members 32 provided to the image forming drum 36, and the paper is conveyed toward the downstream side by rotation of the image forming drum 36.

A head unit 60, serving as the liquid droplet ejection device of the present exemplary embodiment, configured with single-pass inkjet heads 94, is disposed above the image forming drum 36, in close proximity to the surface of the image forming drum 36. Inkjet heads 94, at least for the basic colors YMCK, are arrayed in the head unit 60 around the circumferential direction of the image forming drum 36. The inkjet heads 94 form images for each of the colors by ejecting ink from nozzles (droplet ejection) onto the processing liquid layer that was formed on the recording face of the paper in the processing liquid application section 14. Details regarding a liquid droplet ejection device 71 of the present exemplary embodiment provided with the inkjet heads 94 are described below.

The processing liquid possesses the ability to aggregate in the processing liquid colorant and latex particles that were dispersed in the ink, and aggregated bodies are formed on the paper, without for example color-run, or the like, occurring. As an example of a reaction between the ink and the processing liquid, acid may be contained in the processing liquid, the pigment dispersion broken down by reducing the pH, and the pigment aggregated. Such a mechanism may be employed in order to avoid color bleeding, color mixing of each of the colors between the inks, and ejected droplet interference due to liquid merging when ink droplets impact.

By performing droplet ejection synchronized to an encoder (not shown in the drawings), disposed on the image forming drum 36 and detecting rotation speed, the inkjet heads 94 are able to determine the impact position of droplets with high precision, and are also capable of reducing ejected droplet unevenness without being affected by vibrations of the image forming drum 36, the precision of a rotation shaft 62, or the drum surface speed.

Note that the head unit 60 is retractable from above the image forming drum 36, with retraction of the head unit 60 from above the image forming drum 36 implemented when maintenance operations, such as, for example, nozzle face cleaning of the inkjet heads 94, removal of congealed ink, or the like, are executed.

The paper formed with an image on the recording face is conveyed by rotation of the image forming drum 36 toward an intermediate conveying unit 56 provided between the image forming section 16 and the ink drying section 18.

Ink Drying Section

The ink drying drum 38 (described later) is rotatably provided within the ink drying section 18, and plural heated air nozzles 64 and IR heaters 66 are provided above the ink drying drum 38, in close proximity to the surface of the ink drying section 18.

In the present exemplary embodiment, as an example, one of the IR heaters 66 may be alternately arrayed parallel to the heated air nozzles 64, so as to be disposed one on the upstream side and one on the downstream side of the heated air nozzles 64. However, there is no limitation thereto, and, for example, many of the IR heaters 66 may be disposed at the upstream side, with a lot of heat energy irradiated at the upstream side, raising the temperature of the water content, and many of the heated air nozzles 64 may be disposed at the downstream side to blow away the saturated water vapor.

In the portion of the paper formed with the image, the solvent medium that has been separated by the action of colorant aggregation is dried by the warm air from the heated air nozzles 64 and the IR heaters 66, forming an image layer of a thin film.

The paper with dried image on the recording face thereof is conveyed by rotation of the ink drying drum 38 toward an intermediate conveying section 56, disposed between the ink drying section 18 and the image fixing section 20.

Image Fixing Section

The image fixing drum 40 is rotatably provided in the image fixing section 20, and the image fixing section 20 has functionality for heating and pressing the latex particles in the thin-layered image layer that was formed on the ink drying drum 38, fusing the latex particles and immobilizing and fixing to the paper.

A heat roller 68 is disposed above the image fixing drum 40, in close proximity to the surface of the image fixing drum 40. The heat roller 68 incorporates a halogen lamp within a metal pipe of good heat conductivity, such as, for example, aluminum or the like, and due to the heat roller 68, the latex is imparted with heat energy of the glass transition temperature Tg or greater. By so doing, the latex particles fuse, and when fixing is performed by pressing into the undulations on the paper, it is possible to obtain glossiness by leveling the undulations of the image surface.

A fixing roller 69 is provided at the downstream side of the heat roller 68, with the fixing roller 69 disposed in a pressing state onto the surface of the image fixing drum 40 such that a nip force is obtained between the fixing roller 69 and the image fixing drum 40. Configuration is therefore made with at least one of the surface of the fixing roller 69 or the surface of the image fixing drum 40 having a resilient layer thereon, a configuration having a uniform nip width onto the paper.

The paper fixed with an image on the recording face by the above processes, is conveyed by rotation of the image fixing drum 40 to the side of the discharge section 21, provided at the downstream side of the image fixing section 20.

Explanation has been given in the present exemplary embodiment regarding the image fixing section 20. However, since it is sufficient for the image formed on the recording face to be dried and fixed by the ink drying section 18, configuration may also be made without the image fixing section 20.

Figure 2:
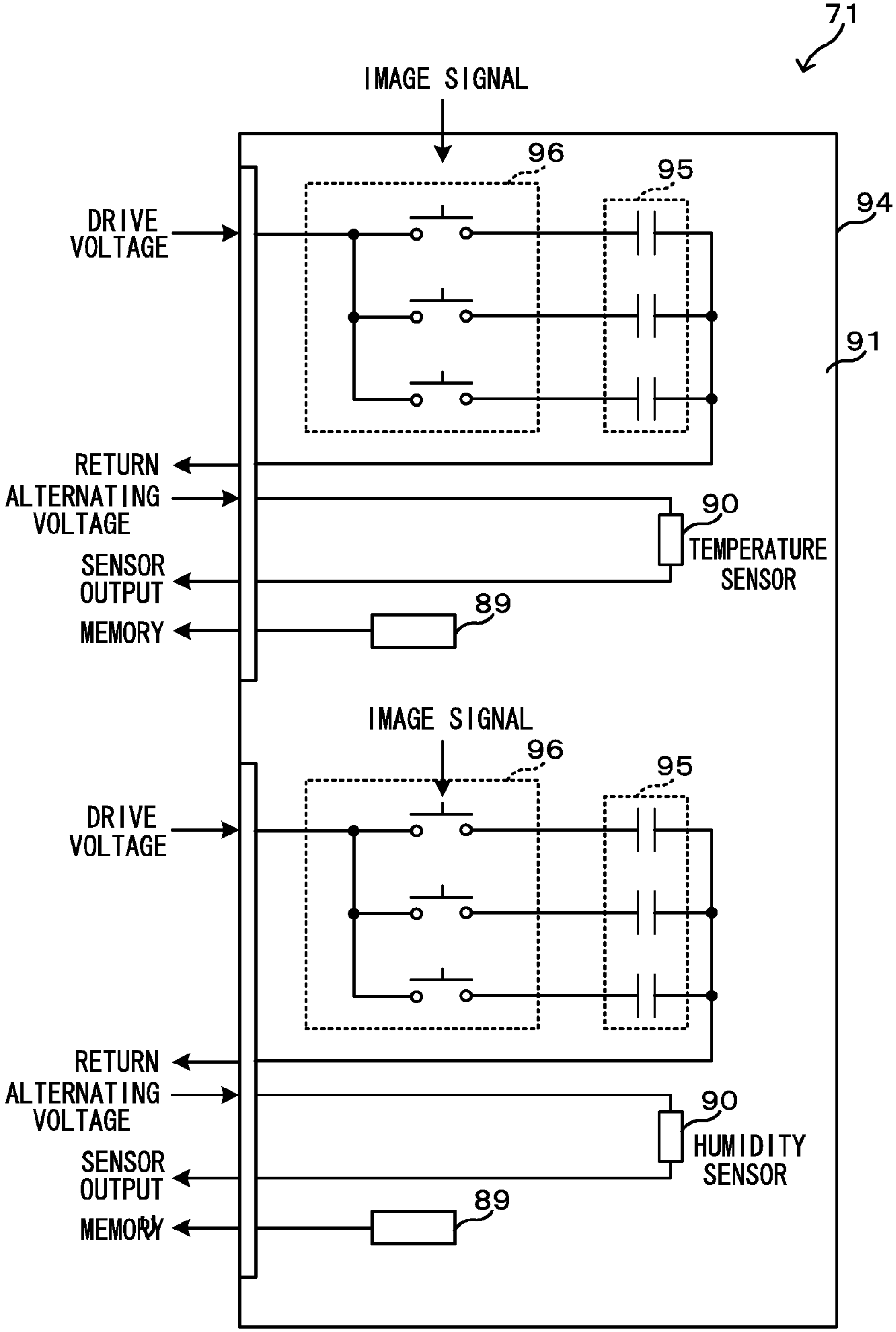
FIG. 2 is a schematic configuration diagram of an example of an inkjet head equipped with a liquid droplet ejection device according to an exemplary embodiment of the present invention.

Explanation will now be given regarding the liquid droplet ejection device according to the present exemplary embodiment. FIG. 2 shows a schematic configuration diagram of an example of inkjet heads provided to the liquid droplet ejection device of the present exemplary embodiment.

In the inkjet heads 94 provided to the liquid droplet ejection device 71 of the present exemplary embodiment, circuits (a pair of circuits) are mounted on a substrate 91, with the circuits being similar to each other except for in the type of sensor. The inkjet heads 94 of the present exemplary embodiment are mounted with a storage section 89, such as, for example, a memory or the like, a sensor 90 that is either a temperature sensor or a humidity sensor, a piezoelectric actuator 95 for ejecting liquid droplets, and an analog switch 96 for switching the piezoelectric actuator 95 ON or OFF based on image data. In FIG. 2, a case is shown where there is one each of a temperature sensor and a humidity sensor mounted internally to the inkjet head 94. The temperature sensor detects the temperature of the internal space of the inkjet head 94, and the humidity sensor detects the humidity of the internal space of the inkjet head 94. Note that there is no limitation thereto, and sensors of one or other type only may be mounted. Furthermore, in the present exemplary embodiment there is one of the storage sections 89 provided for each of the respective sensors 90. However, there is no limitation thereto, and a single storage section 89 may store data relating the type of sensor 90 for all of the sensors 90 mounted to the piezoelectric actuators 95. Furthermore, in the present exemplary embodiment, there is no limitation to configuration with a pair of circuits mounted on the same substrate, and a single circuit may be mounted, or an even greater number of circuits may be mounted.

In the inkjet head 94 of the present exemplary embodiment, when a drive voltage is input, the analog switch 96 is switched ON or OFF based on an image signal, the piezoelectric actuator 95 is driven, and liquid droplets are ejected from the nozzles. One of the sensors 90 detects the peripheral temperature at the piezoelectric actuator 95, and the other of the sensors 90 detects the peripheral humidity at the piezoelectric actuator 95. The sensors 90 output signals according to the temperature or humidity, with these being output to the current-voltage conversion circuit of a signal processing device.

Figure 3:
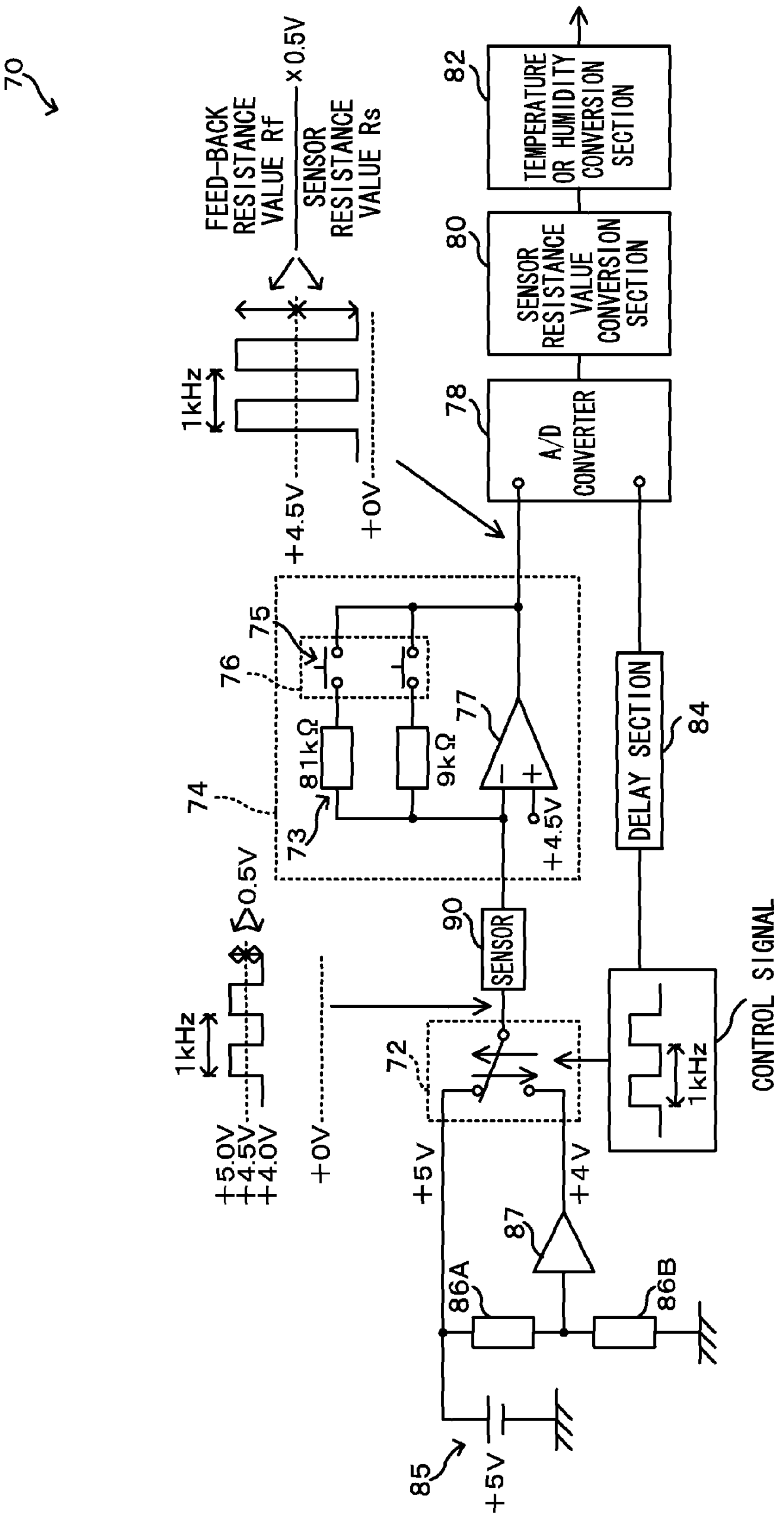
FIG. 3 is a schematic configuration diagram showing a schematic configuration of an example of a signal processing device according to an exemplary embodiment of the present invention.

Next, detailed explanation follows regarding the signal processing device of the present exemplary embodiment. FIG. 3 shows a schematic configuration diagram of an example of a signal processing device of the present exemplary embodiment.

A signal processing device 70 of the present exemplary embodiment includes: a multiplexer 72, a current-voltage conversion circuit 74, a selector circuit 76, an A/D converter 78, a sensor resistance value conversion section 80, a temperature or humidity conversion section 82, a reference power source 85, resistance voltage dividers 86A, 86B, and a buffer 87.

The current-voltage conversion circuit 74 of the present exemplary embodiment has feed-back resistors 73 of plural types, an analog switch 75 connected to each of the respective feed-back resistors 73 (selector circuit 76), and an operational amplifier 77.

Figure 4:
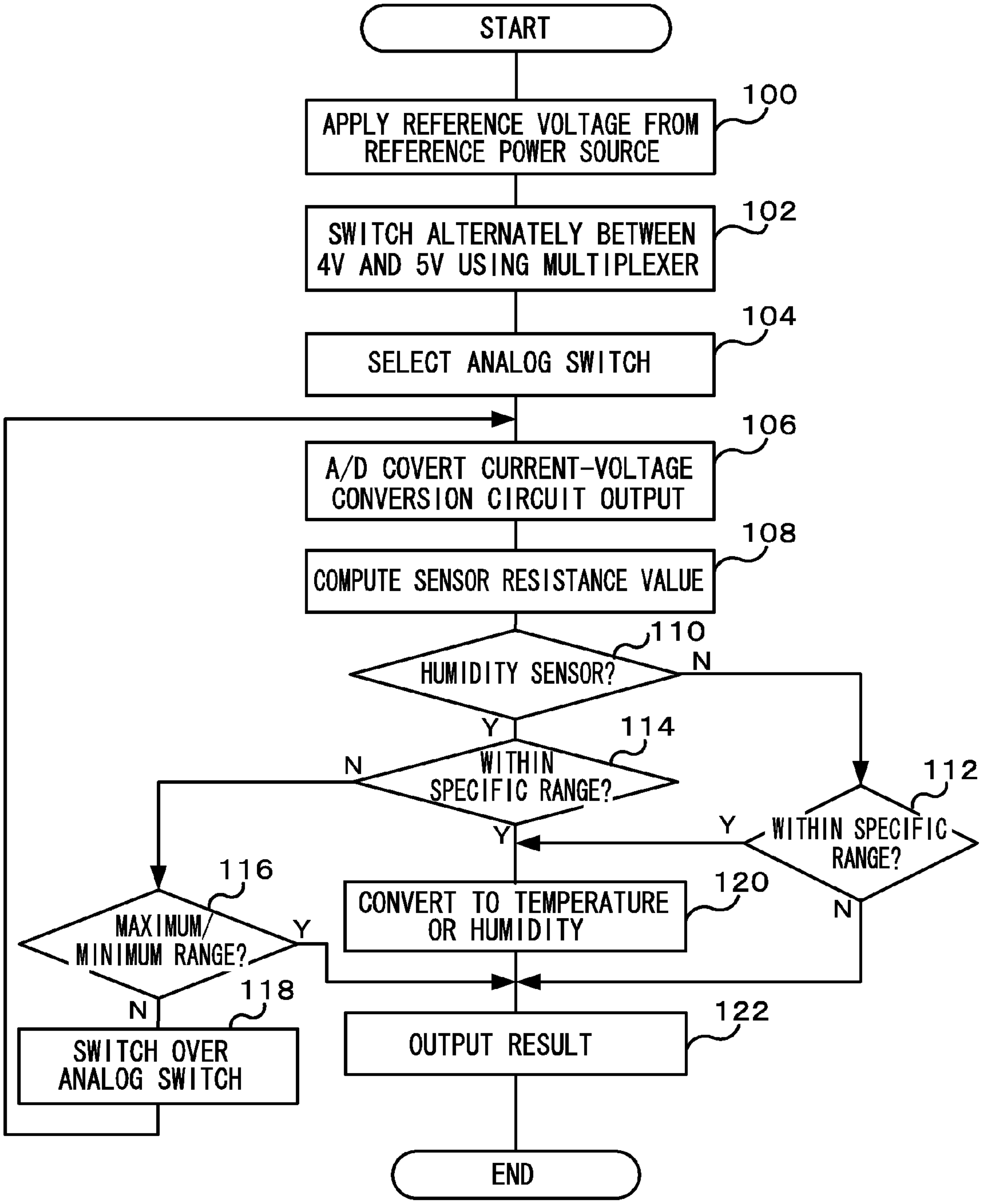
FIG. 4 is a flow chart showing an example of operation of a signal processing device according to an exemplary embodiment of the present invention.

Detailed explanation follows of operation of the signal processing device 70 of the present exemplary embodiment. FIG. 4 shows a flow chart of an example of operation of the signal processing device 70 of the present exemplary embodiment.

At step 100, a reference voltage is applied from the reference power source 85. The reference power source 85 is a direct current power source with a reference voltage of +5V. The reference voltage is divided by the resistance voltage dividers 86A, 86B, making +4V (=+4.4−0.5V), and +5V (+4.5+0.5V). The signal line of +4V and the signal line of +5V are connected to an analog multiplexer 72. One end of the sensor 90 is connected to the output of the multiplexer 72.

At the next step 102, the multiplexer 72 is controlled by a control signal of 1 kHz (duty ratio 50%). The two signal lines (+4V and +5V) are thereby alternately switched over and connected to the sensor 90. Consequently, as shown in FIG. 3, one electrical potential of the sensor 90 is an electrical potential that repeatedly switches between +4V and +5V, at a frequency of 1 kHz.

However, the other end of the sensor 90 is connected to an inverting terminal of the operational amplifier 77 included in the current-voltage conversion circuit 74. +4.5 V is connected to the non-inverting terminal of the operational amplifier 77. Since the inverting terminal and the non-inverting terminal of the operational amplifier 77 are at substantially the same electrical potential, due to hypothetical grounding, the electrical potential of the other end of the sensor 90 becomes +4.5V. Consequently, the potential difference between the two ends of the sensor 90 is ±0.5V, with a frequency of 1 kHz. Due thereto, ±0.5V can be precisely applied to the sensor 90. Namely, a square shaped alternating voltage can be pseudo-generated from the direct voltages of +4V and +5V, and applied to the sensor 90. Note that when the sensor 90 is taken as a temperature sensor, one or other of the direct voltages may be applied, without generating the alternating voltage (by fixing the multiplexer 72).

At the next step 104, selection is made from plural analog switches 75 in the selector circuit 76. Selection is thereby made from plural feed-back resistors 73 of different resistance values in the current-voltage conversion circuit 74. By selecting the feed-back resistor 73 in this manner, correspondence can be made in the current-voltage conversion circuit 74, and the range of sensor current Is (sensor resistance value Rs) input from the sensor 90 can be selected.

Note that in the signal processing device 70 of the present exemplary embodiment shown in FIG. 3, there are two individual (two pairs) of the feed-back resistors 73 and the analog switches 75 shown. However, there is no limitation thereto, and, in order to increase the dynamic range, a configuration may be provided with a greater number of pairs of the feed-back resistors 73 and the analog switch 75.

Note that, selection of the analog switch 75 is by switching ON the analog switch 75, such that feed-back is by the feed-back resistor 73 of a pre-set resistance value as a default here. Furthermore, in the present exemplary embodiment, there is no limitation to employing the analog switch 75, and, for example, a multiplexer may be employed.

By switching the analog switch 75 ON, the sensor current Is that has been output from the sensor 90 is output at a current-voltage converted voltage. In the sensor 90, the sensor current Is has the relationship of Equation (1) below.

$$\text{Sensor current } Is = \text{sensor voltage } Vs(+0.5\text{V})/\text{sensor resistance value } Rs \quad (1)$$

In addition, the current-voltage conversion circuit 74 has the relationship of Equation (2) below.

$$\text{Output voltage } Vo \text{ of the operational amplifier } \mathbf{77} = +4.5\text{V} + \text{sensor current } Is \times \text{feed-back resistance value } Rf \quad (2)$$

Consequently, from Equation (1) and Equation (2), sensor resistance value Rs is computed according to Equation (3) below.

$$\text{Sensor resistance value } Rs = \text{sensor voltage } Vs \times \text{feed-back resistance value } Rf/(\text{operational amplifier output } Vo - 4.5)(\Omega) \quad (3)$$

The output voltage (operational amplifier output) Vo of the operational amplifier 77 is a square signal centered on +4.5V, as shown in FIG. 3. The amplitude thereof, as can be seen from above Equation (2), depends on the sensor resistance of the sensor 90. For example, in a case where the resistance value of the selected feed-back resistor 73 is 9 kΩ, when the sensor resistance value Rs is 1 kΩ, the operational amplifier output Vo is a square wave of 0V and +9V, and when the sensor resistance value Rs=9 kΩ, the operational amplifier output Vo is a square wave of +4V and +5V. Similarly, in a case where the resistance value of the selected feed-back resistor 73 is 81 kΩ, when the sensor resistance value Rs is 9 kΩ, the operational amplifier output Vo is a square wave of 0V and +9V, and when the sensor resistance value Rs is 81 kΩ, the operational amplifier output Vo is a square wave of +4V and +5V. Hence, due to a control section (described below) selecting an appropriate feed-back resistor 73, correspondence can be made to sensor resistance value Rs of 1 to 81 kΩ.

Note that in the present exemplary embodiment, since a square shaped voltage of ±0.5V centered on +4.5V is employed, the range of sensor resistance values Rs that can be accommodated by the feed-back resistors 73 is sensor resistance value Rs=feed-back resistance value Rf to ⅑ Rf.

Note that when putting into practice, in consideration of the variation in characteristics of individual circuit components, the detection ranges of the sensor resistance value Rs with each of the feed-back resistors 73 may be made to overlap. As a specific example, they may be made to overlap by about 30%.

In the present exemplary embodiment, since there is a large dynamic range, the sensor resistance values Rs of the sensors 90 do not need to be logarithmically compressed. Consequently, due to the precise reference power source 85, the operational amplifier 77, and selection of the feed-back resistor 73 of the appropriate resistance value, accurate temperature detection can be performed at high resolution, even if the sensor 90 is a thermistor.

By selecting the analog switch 75, since the operational amplifier output Vo is output from the current-voltage conversion circuit 74, in the next step 106, the operational amplifier output Vo is analog-digital (A/D) converted by the A/D converter 78.

Generally, in a circuit such as this, A/D conversion is performed on an analog voltage output from an operational amplifier. In the present exemplary embodiment, synchronization is made to the output square wave of 1 kHz, and A/D conversion is performed. Specifically, A/D conversion may be performed after delaying the rising edge or the falling edge of the square wave by a specific period of time. In the present exemplary embodiment, a signal from a control signal that has been delayed in a delay section 84 by a specific period of time is input to the A/D converter 78, the input signal is synchronized therewith, and A/D conversion performed.

Immediately after the rising or falling edge of the square wave, due to the response characteristics of the analog circuit, the analog output is not stable. Therefore, a certain period of time is required until stability is reached. This period of time until stability is reached is obtained in advance, and stable A/D conversion is performable by delaying the timing for synchronization by this specific period of time.

Furthermore, since a high voltage such as +9V cannot generally be directly input to the A/D converter 78, the voltage generally needs to be reduced, for example, to ¼ times, before A/D conversion is carried out.

At the next step 108, the sensor resistance value Rs is computed by the sensor resistance value conversion section 80. After A/D conversion, the resistance value of the sensor 90 is derived, based on the converted digital data, and on data of the selected feed-back resistance value Rf. As a specific example thereof, in FIG. 3, consider a case where ¼ times the operational amplifier output Vo is A/D converted by a 12 bit A/D converter of +2.5V full scale voltage. Take the peak voltage of the square wave as that which is A/D converted. When this occurs, the input voltage of the A/D converter 78 is as expressed in Equation (4) below.

$$\text{A/D converter input voltage} = 0.25 \times (4.5 + Rf/Rs \times 0.5)\,(\text{V}) \quad (4)$$

Thereby, if the A/D converted digital data is D, then the sensor resistance value Rs is computed from the following Equation (5).

$$\text{Sensor resistance value } Rs = (Rf \times 0.5)/(D/4095 \times 10 - 4.5)\,(\Omega) \quad (5)$$

Figure 5:
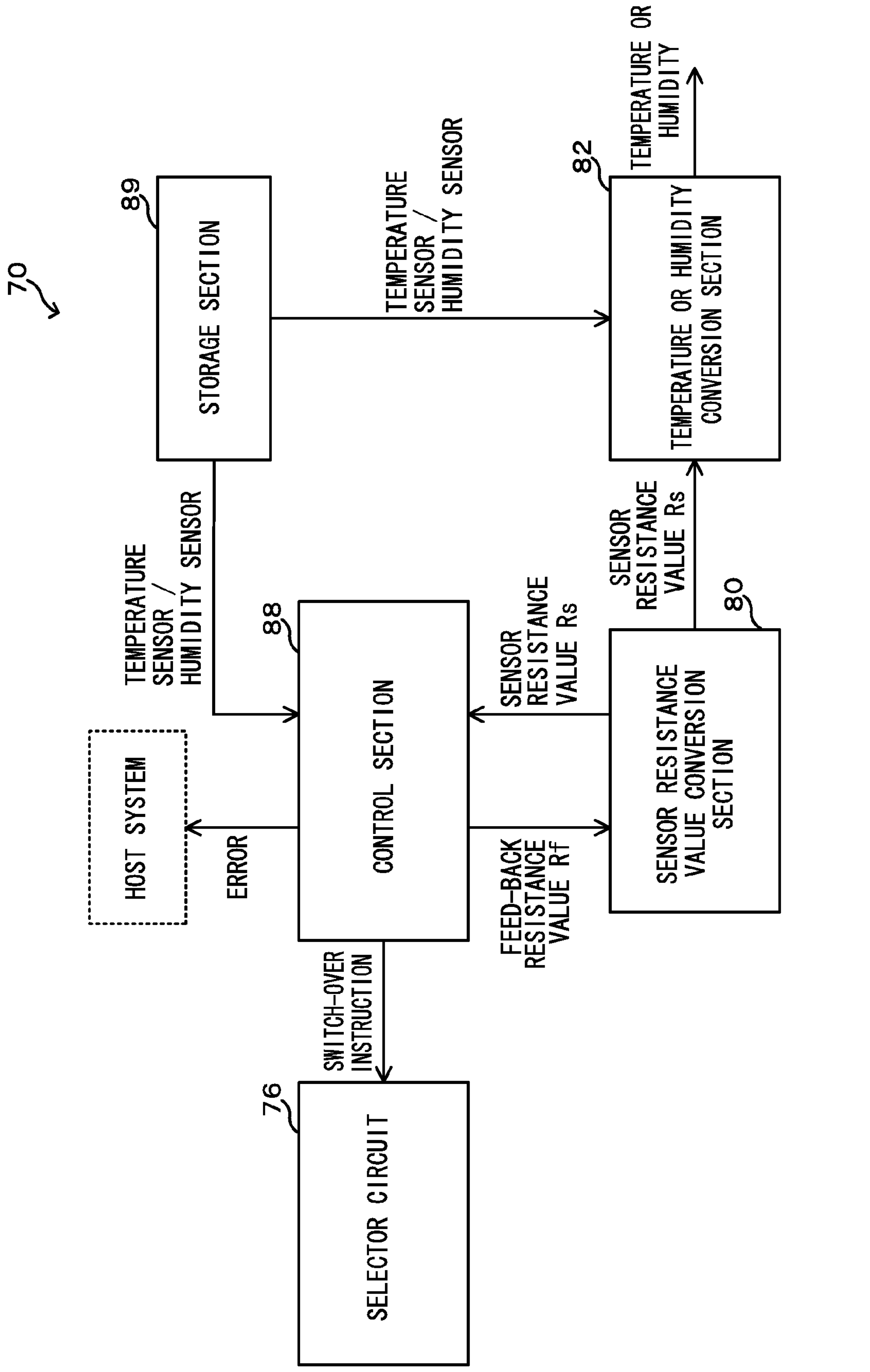
FIG. 5 is a functional flow chart showing an example of a configuration according to an exemplary embodiment of the present invention, relating to the function for converting a sensor resistance value Rs into a temperature or humidity.

At the next step 110, in order to convert the sensor resistance value Rs into temperature or humidity using the temperature or humidity conversion section 82, determination is made as to whether or not the sensor 90 is a humidity sensor. A function block diagram of an example of a configuration relating to the functionality for converting the sensor resistance value Rs of the sensor 90 into temperature or humidity is shown below in FIG. 5. Accordingly, first an outline operation of the signal processing device 70 is shown. A control section 88 selects the feed-back resistor 73 of the selector circuit 76. The control section 88 outputs the resistance value Rf of the selected feed-back resistor 73 to the sensor resistance value conversion section 80. The sensor resistance value conversion section 80 computes the sensor resistance value Rs as described above, based on the feed-back resistance value Rf input from the control section 88, and outputs the sensor resistance value Rs to the control section 88 and to the temperature or humidity conversion section 82. In the control section 88, when the type of sensor 90 stored in the storage section 89 is a humidity sensor, determination is made as to whether the sensor resistance value Rs is an appropriate value (step 114 of FIG. 4), and when not appropriate, the control section 88 specifies an analog switch 75 (step 118 of FIG. 4) so that a feed-back resistor 73 with another resistance value is selected in the selector circuit 76. Furthermore, the temperature or humidity conversion section 82 performs conversion into temperature or humidity based on the sensor resistance value Rs input from the sensor resistance value conversion section 80 and the type of sensor 90 acquired from the storage section 89 (step 120 of FIG. 4), and outputs (step 122 of FIG. 4) the result. Furthermore, when the sensor resistance value Rs does not fall within a specific range, the control section 88 determines that there is an abnormality (affirmative determination at step 116 of FIG. 4, negative determination at step 112) and outputs an error message to the host system.

Detailed explanation follows regarding conversion of the sensor resistance value Rs into temperature or humidity.

Figure 8:
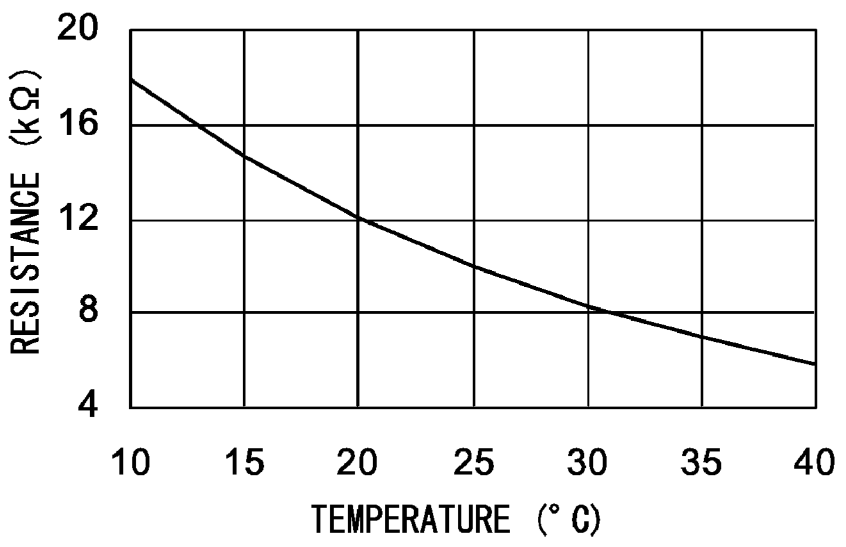
FIG. 8 is an explanatory diagram that shows a specific example of the relationship between resistance value and temperature of a thermistor.
Figure 9:
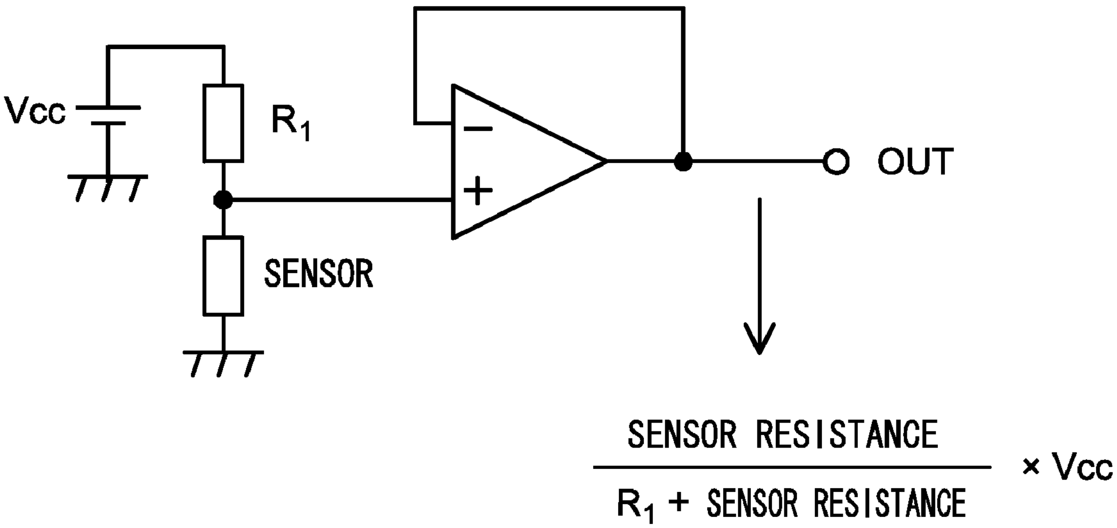
FIG. 9 is a circuit diagram showing an example of a temperature sensor circuit for generating a voltage corresponding to the resistance value of a thermistor.
Figure 10:
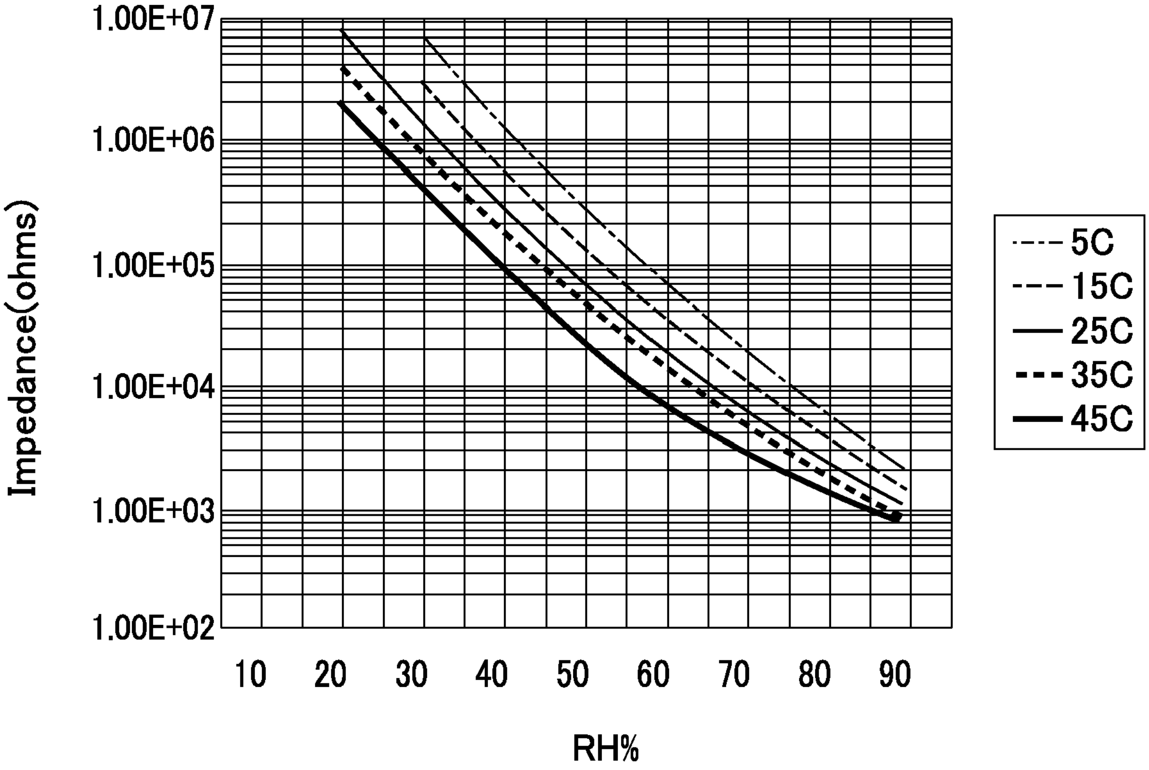
FIG. 10 is an explanatory diagram showing a specific example of the relationship between resistance value and humidity of a humidity sensor.
Figure 11:
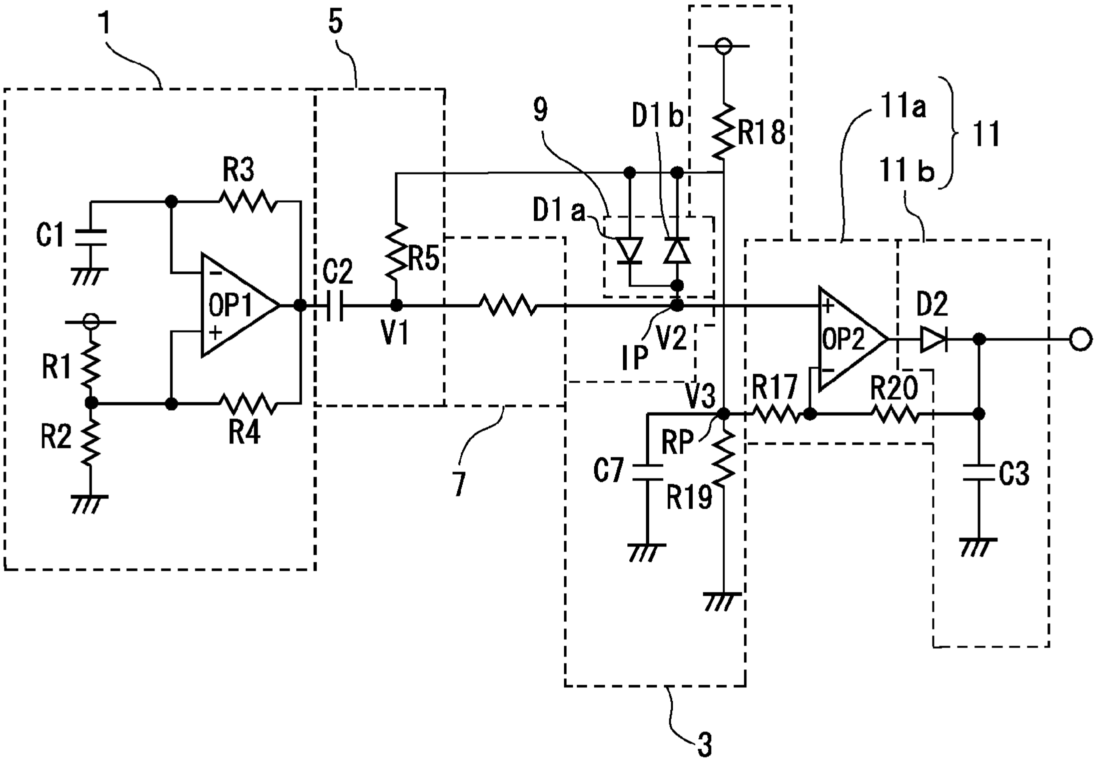
FIG. 11 is a circuit diagram showing an example of a humidity sensor circuit for generating a voltage corresponding to the resistance value of a humidity sensor.

When the temperature or humidity is being derived from the sensor resistance value Rs, as an example thereof, a look up table may be employed, as shown in FIG. 8 and FIG. 10. Furthermore, there is also a method of straight line filling-in using interpolation, based on digital data of the nearest two values of sensor resistance value Rs, and finally deriving the temperature or humidity. In the case of a humidity sensor, data may be stored expressing the correspondence relationships between sensor resistance value Rs and humidity for plural specific surrounding temperatures. Since the characteristics of a humidity sensor change according to the surrounding temperature, there is a method of detecting the temperature within the inkjet head 94 using the sensor 90 that is a temperature sensor within the same inkjet head 94, acquiring appropriate table data of the humidity sensor based on the detection result, and finally deriving the humidity.

Note that in the present exemplary embodiment, when data stored in the memory of the inkjet head 94 is data that indicates that the type of sensor 90 is a temperature sensor (thermistor), then determination of an abnormality is made when the sensor resistance value Rs converted by the sensor resistance value conversion section 80 exceeds a specific range. In the present exemplary embodiment, when abnormality is determined, the fact that there is an abnormality is output to the host system (for example, to a control section, or the like, that controls the image forming apparatus 10). However, when data stored in the storage section 89 is data that indicates that the type of sensor 90 is a humidity sensor, then if the sensor resistance value Rs is lower or higher than a specific range, the feed-back resistor 73 in the selector circuit 76 is switched over to a feed-back resistor 73 with a different resistance value, the sensor resistance value Rs is re-acquired, with this being repeated until the value falls within the specific range. When the sensor resistance value Rs is within a range of overlap of the feed-back resistors 73, one or other of the computation values may be selected, an average of both may be taken, or the final sensor resistance value Rs may be taken. Note that after the feed-back resistor 73 has been selected, if the sensor resistance value Rs is lower or higher than a specific range in the dynamic range from the maximum value to the minimum value of the current-voltage conversion circuit 74, then an abnormality is determined, and similarly to with a temperature sensor, an error message is output to the host system.

Figure 6:
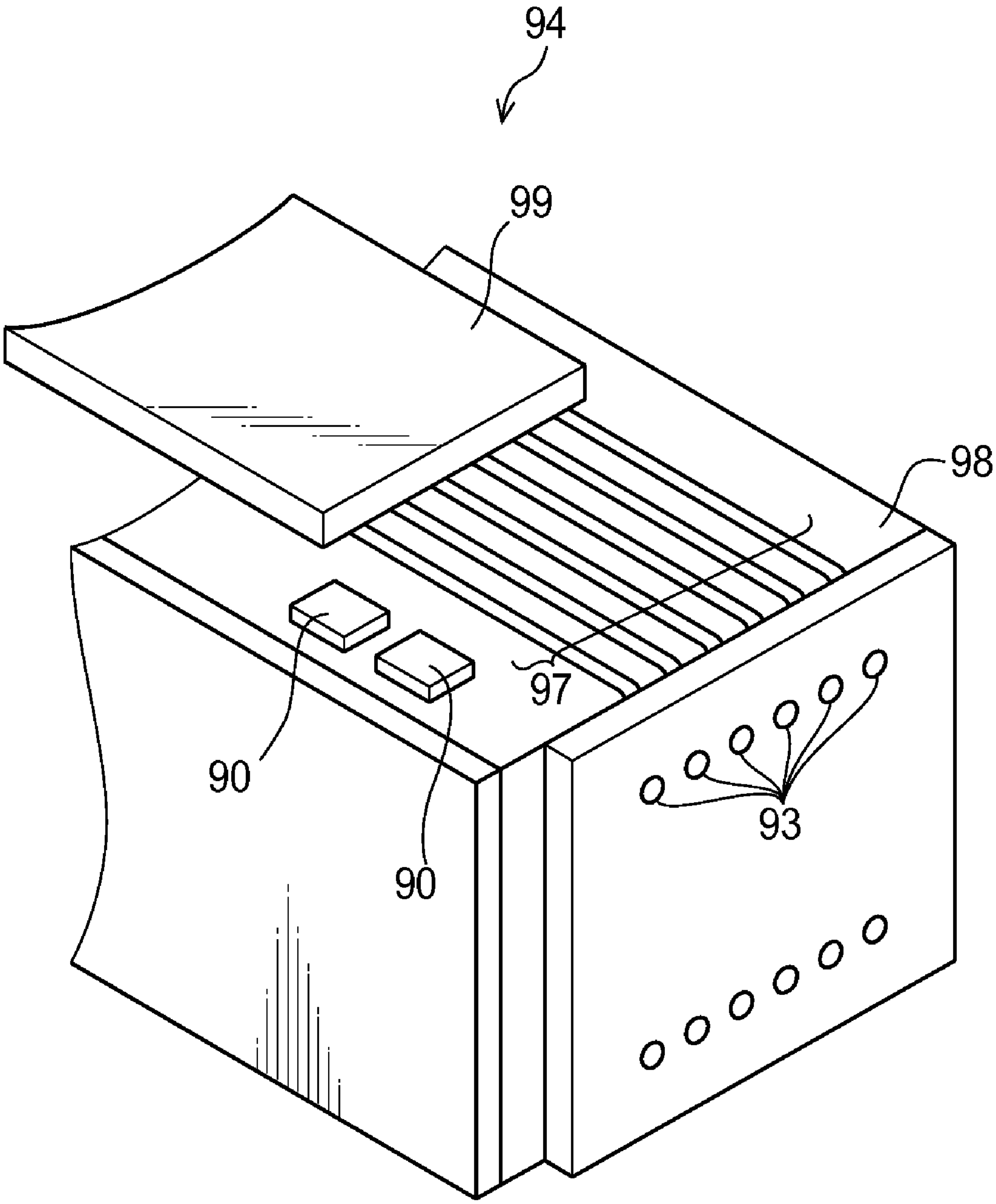
FIG. 6 is a schematic configuration diagram of the external appearance of an inkjet head in order to show another example of sensor placement according to an exemplary embodiment of the present invention.

Note that in the present exemplary embodiment, as shown in FIG. 2, explanation has been given of a case where the temperature within the inkjet head 94 is detected by a temperature sensor 90, and the humidity of the internal space of the inkjet head 94 is detected by a humidity sensor 90, provided within the inkjet head 94. However, there is no limitation thereto, such to these placements for each of the sensors 90 or the like. For example, as shown in FIG. 6, the sensor 90 may be placed external to the inkjet head 94. FIG. 6 is a schematic configuration diagram showing the external appearance of an inkjet head 94. Note that, for example, the placement and the number of nozzles 93, and the like, is only an example thereof, and are not limitations to the present exemplary embodiment. Furthermore, a case is shown in which a single Integrated Circuit (IC) 99 is provided, however there is no limitation thereto, and configuration may be provided with plural of the IC's 99. Furthermore, a cover normally employed to the inkjet head 94, so that ink is not touched and electrical wiring lines are not shorted, is omitted from illustration in the drawing. The inkjet head 94 of the present exemplary embodiment is equipped with plural of the nozzles 93, and for ejecting ink from each of the nozzles 93, there is a wiring pattern 97, connected to a piezoelectric actuator 95 and an analog switch 96, formed on a flexible substrate 98. The IC 99 is also provided. Furthermore, the IC 99 is for conversion of the image data, this being a serial signal, to a parallel signal, and the analog switch 96 is also included.

Figure 7:
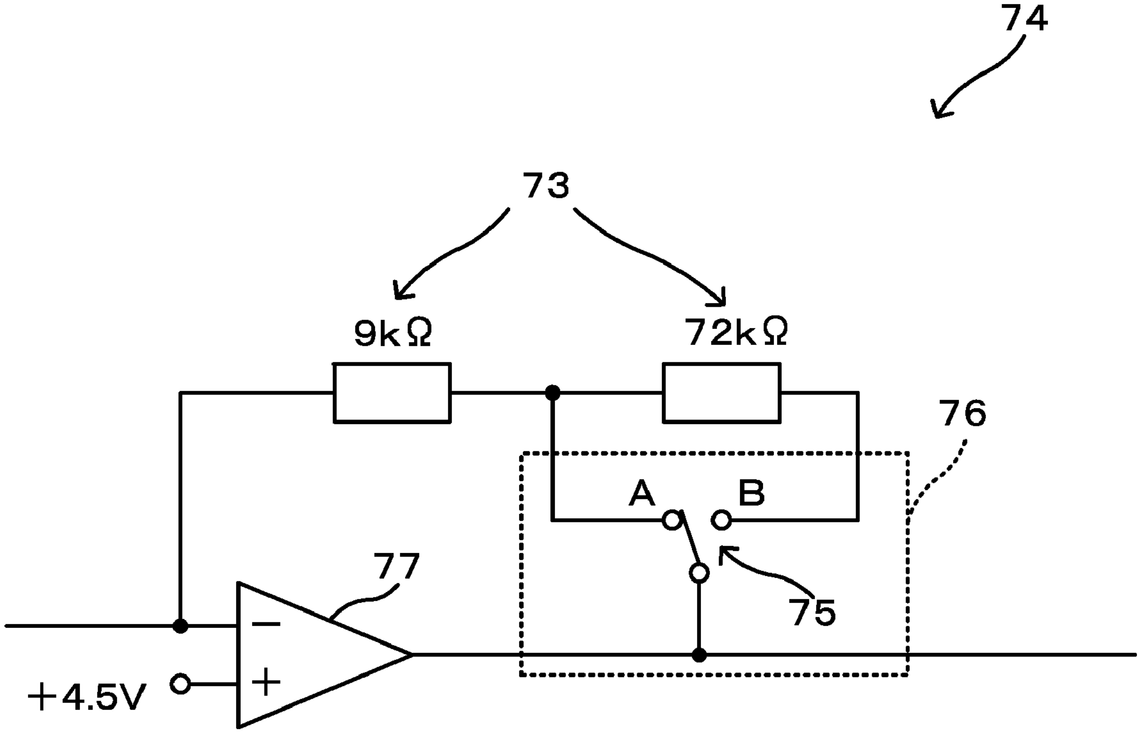
FIG. 7 is a circuit diagram showing another example of a current-voltage conversion circuit according to an exemplary embodiment of the present invention.

In the case shown in FIG. 6, the temperature sensor 90 detects the external peripheral temperature of the inkjet head 94. Furthermore, the humidity sensor 90 detects the external peripheral humidity of the inkjet head 94. Note that when placing the sensors 90 external to the inkjet head 94 there is no limitation to those locations shown in FIG. 6. For example, placement may be made so as to be on the face formed with the nozzles 93, however preferably placement is made in a location where ink does not adhere. Furthermore, in the present exemplary embodiment, explanation is given regarding the current-voltage conversion circuit 74 with different types of feed-back resistors 73 that are mutually connected together in parallel, however the configuration of the current-voltage conversion circuit 74 is not limited thereto. For example, as shown in FIG. 7, configuration may be made with the feed-back resistors 73 mutually connected together serially, such that the feed-back resistors 73 are switched between using the selector circuit 76. In FIG. 7, when the analog switch 75 of the selector circuit 76 is connected to side A, a state is arrived at in which the feed-back resistor 73 of 9 kΩ is connected to the operational amplifier 77. However, when the analog switch 75 of the selector circuit 76 is connected to side B, a state is arrived at in which the feed-back resistor 73 of 9 kΩ and the feed-back resistor 73 of 72 kΩ are connected to the operational amplifier 77. Namely, a state is arrived at in which feed-back resistance of 9+72=81 kΩ is connected to the operational amplifier 77.

Furthermore, in the present exemplary embodiment, explanation has been given of a case in which the inkjet head 94 is a piezoelectric head, ejecting ink from nozzles using the piezoelectric actuator 95, however there is no limitation thereto. Other types of head may be employed such as, for example, a thermal inkjet head in which ink is ejected by generating gas bubbles in ink within tubes by applying heat using a heat generating actuator.

As explained above, in the signal processing device 70 of the present exemplary embodiment, the multiplexer 72 is switchable, based on a control signal, between a direct voltage of +4V or +5V generated by resistance to a reference voltage. A square shaped alternating voltage can thereby be applied to the sensor 90. Furthermore, the current-voltage conversion circuit 74 that converts current output from the sensor 90 into voltage has plural feed-back resistors 73 of different resistance values, and the type (resistance value) of the feed-back resistor 73 is selected by switching over the analog switch 75 of the selector circuit 76. Due thereto, a feed-back resistor 73 is selected according to the sensor resistance value Rs, and the dynamic range can be increased. Consequently, in the signal processing device 70 of the present exemplary embodiment, using the same circuit, the resolution of temperature is high, and a dynamic range corresponding to the detection range for humidity can be achieved.

Furthermore, due to being able to use the same circuit for the temperature sensor circuit and the humidity sensor circuit, there is a reduction in the number of signal lines and the like, and the cost for circuit production can be suppressed, in comparison to cases where separate circuits are installed.

Alternating voltage generation according to a first aspect of the present invention generates a square shaped alternating voltage from plural direct voltages, and applies the square shaped alternating voltage to a sensor that is either a temperature detection sensor or a humidity detection sensor. Current flows in the sensor to which the alternating voltage is applied, based on the sensor resistance value, which depends on the temperature and the humidity. A current-voltage conversion section converts current as the sensor output to an analog voltage. A selector section selects a range of the current convertible by the current-voltage conversion section from one or other of plural current ranges. A resistance value computation section computes the resistance value of the sensor, based on the voltage value of the analog voltage converted by the current-voltage conversion section, the range of current convertible by the current-voltage conversion section, and the voltage value of the voltage generated by the alternating voltage generation section.

In this manner, according to the signal processing device of the present invention, since an alternating voltage can be generated from direct voltages and applied to a sensor, appropriate driving can be made even when the sensor is a humidity sensor. Furthermore, since the selector section can select one or other of plural ranges for the range of current convertible by the current-voltage conversion section, the dynamic range of the current-voltage conversion section can be increased. Furthermore, since logarithmic compression of the sensor resistance value is not then required, high resolution of temperature, and the dynamic range corresponding to a humidity detection range is achieved.

Consequently, sensor driving and computation of the sensor resistance value from the output signal of the sensor can be performed, irrespective of whether the sensor is a temperature sensor or a humidity sensor.

The signal processing device may further include a control section that selects the range of current convertible by the current-voltage conversion section according to the resistance value of the sensor computed by the resistance value computation section, and controls the selector section so as to switch over to the selected current range.

The control section selects the range of current according to the sensor resistance value computed by the resistance value computation section, and controls the selector section so as to select the selected range. Since the range of current can be selected according to the sensor resistance value, an appropriate current range can be selected.

The signal processing device may further include an output section that converts the resistance value of the sensor computed by the resistance value computation section into a temperature or humidity, according to the type of sensor, and outputs the result.

The output section converts the computed resistance value of the sensor into a temperature for a temperature sensor, or humidity for a humidity sensor, and outputs the result. The temperature or the humidity can thereby be known.

In the signal processing device: a periodic signal expressing the period of the square shaped alternating voltage generated by the alternating voltage generation section may be input to the resistance value computation section; and the resistance value computation section may include an A/D conversion section that converts into a digital signal the analog voltage synchronized to the periodic signal and converted by the current-voltage conversion section, and computes the resistance value of the sensor based on the voltage value of the digital signal converted by the A/D conversion section, the range of current convertible by the current-voltage conversion section, and the voltage value of the voltage generated by the alternating voltage generation section.

The A/D conversion section converts into a digital signal the analog voltage that is synchronized to the periodic signal of the square shaped alternating voltage and converted by the current-voltage conversion section. An alternating bias can thereby be applied when the sensor is a humidity sensor.

The signal processing device may further include a delay section that delays the timing at which the periodic signal is input to the A/D conversion section by a specific period of time, compared to the timing at which the analog voltage converted by the current-voltage conversion section is input to the A/D conversion section.

The delay section delays the timing at which the periodic signal is input to the A/D conversion section by a specific period of time, compared to the timing at which the analog voltage is input. A certain period of time is generally required until an analog output becomes stable, due to response characteristics of an analog circuit. By delaying the timing for synchronization, with the period of time until stable used as the specific period of time, stable A/D conversion can be performed.

The signal processing device may further include a storage section that stores a type of the sensor, wherein the output section converts the resistance value of the sensor computed by the resistance value computation section into a temperature or humidity based on the type of sensor stored in the storage section.

The storage section stores the type of sensor. The type of sensor is thereby known.

In the signal processing device: the alternating voltage generation section may be an alternating voltage generation circuit that generates a square shaped voltage that has a central voltage of a specific voltage from the direct voltages, and applies the square shaped voltage to the sensor that is either a temperature detection sensor or a humidity detection sensor; and the current-voltage conversion section may be a current-voltage conversion circuit that includes the selector section and includes, an operational amplifier with a non-inverting input terminal applied with the specific voltage, and an inverting input terminal connected to an output signal output from the sensor, plural types of feed-back resistor connected between an output terminal of the operational amplifier and the inverting input terminal of the operational amplifier, and a selector circuit as the selector section that selects a type of the feed-back resistor for feeding back the output of the operational amplifier from the plural types, wherein the output of the operational amplifier is fed back by the feed-back resistor selected by the selector circuit.

The alternating voltage generation section can be an alternating voltage generation circuit that generates a square shaped voltage that has a central voltage of a specific voltage from the direct voltages, and applies the square shaped voltage to either the temperature detection sensor or the humidity detection sensor. Furthermore, the selector section can be a selector circuit as the selector section, selecting the type of feed-back resistor for feeding back the output of an operational amplifier from plural types thereof. The current-voltage conversion section can be a current-voltage conversion circuit that includes the selector section and includes, an operational amplifier with a non-inverting input terminal applied with the specific voltage, and an inverting input terminal connected to an output signal output from the sensor, plural types of feed-back resistor connected between an output terminal of the operational amplifier and the inverting input terminal of the operational amplifier, and a selector circuit, wherein the output of the operational amplifier is fed back by the feed-back resistor selected by the selector circuit.

A second aspect of the present invention is a liquid droplet ejection device including: a recording head that ejects a liquid droplet from a nozzle and records an image on a recording medium; a sensor that is either a temperature detection sensor that detects one or other of an internal or an external temperature of the recording head, or is a humidity detection sensor that detects one of other of an internal or an external humidity of the recording head; and the signal processing device of the first aspect, connected to the sensor and computing the resistance value of the sensor.

As explained above, according to the present invention, a signal processing device can be provided for processing a signal of a sensor with high resolution of temperature and a dynamic range corresponding to a humidity detection range, and a liquid droplet ejection device of the same.

What is claimed is:

1. A signal processing device comprising:

an alternating voltage generation section that generates a square shaped alternating voltage from a plurality of direct voltages, and applies the square shaped alternating voltage to a sensor that is either a temperature detection sensor or a humidity detection sensor;

a current-voltage conversion section that converts current of an output signal output from the sensor to an analog voltage;

a selector section that selects a range of the current convertible by the current-voltage conversion section from one or more of a plurality of current ranges; and a resistance value computation section that computes a resistance value of the sensor, based on a voltage value of the analog voltage converted by the current-voltage conversion section, the range of current convertible by the current-voltage conversion section, and a voltage value of the voltage generated by the alternating voltage generation section.

2. The signal processing device of claim 1, further comprising a control section that selects the range of current convertible by the current-voltage conversion section according to the resistance value of the sensor computed by the resistance value computation section, and controls the selector section so as to switch over to the selected range of current.

3. The signal processing device of claim 1, wherein:

the alternating voltage generation section is an alternating voltage generation circuit that generates a square shaped voltage that has a central voltage of a specific voltage from the direct voltage, and applies the square shaped voltage to the sensor that is either the temperature detection sensor or the humidity detection sensor; and the current-voltage conversion section is a current-voltage conversion circuit that includes the selector section and comprises, an operational amplifier with a non-inverting input terminal applied with the specific voltage, and an inverting input terminal connected to an output signal output from the sensor, a plurality of types of feed-back resistors connected between an output terminal of the operational amplifier and the inverting input terminal of the operational amplifier, and a selector circuit as the selector section that selects a type of the feed-back resistor for feeding back the output of the operational amplifier from the plurality of types, wherein the output of the operational amplifier is fed back by the type of feed-back resistor selected by the selector circuit.

4. The signal processing device of claim 1, further comprising an output section that converts the resistance value of the sensor computed by the resistance value computation section into a temperature or a humidity, according to a type of the sensor, and outputs the temperature or the humidity.

5. The signal processing device of claim 4, further comprising a storage section that stores a type of the sensor, wherein the output section converts the resistance value of the sensor computed by the resistance value computation section into the temperature or the humidity based on the type of sensor stored in the storage section.

6. The signal processing device of claim 1, wherein:

a periodic signal expressing a period of the square shaped alternating voltage generated by the alternating voltage generation section is input to the resistance value computation section; and the resistance value computation section comprises an A/D conversion section that converts into a digital signal the analog voltage that is synchronized to the periodic signal and converted by the current-voltage conversion section, and the resistance value computation section computes the resistance value of the sensor based on the voltage value of the digital signal converted by the A/D conversion section, the range of current convertible by the current-voltage conversion section, and the voltage value of the voltage generated by the alternating voltage generation section.

7. The signal processing device of claim 6, further comprising a delay section that delays a timing at which the periodic signal is input to the A/D conversion section by a specific period of time compared to a timing at which the analog voltage converted by the current-voltage conversion section is input to the A/D conversion section.

8. A liquid droplet ejection device comprising:

a recording head that ejects a liquid droplet from a nozzle and records an image on a recording medium;

a sensor that is either a temperature detection sensor that detects one or the other of an internal or an external temperature of the recording head, or is a humidity detection sensor that detects one or the other of an internal or an external humidity of the recording head; and the signal processing device of claim 1, connected to the sensor and computing the resistance value of the sensor.

* * * * *